(12) United States Patent
Michaud et al.

(10) Patent No.: US 7,949,943 B2
(45) Date of Patent: *May 24, 2011

(54) ASSIGNING A HOT SPOT IN AN ELECTRONIC ARTWORK

(75) Inventors: Jeffrey H. Michaud, Foster City, CA (US); Douglas K. Olson, Shoreview, MN (US)

(73) Assignee: Adobe Systems Incorporated, San Jose, CA (US)

( * ) Notice: Subject to any disclaimer, the term of this patent is extended or adjusted under 35 U.S.C. 154(b) by 981 days.

This patent is subject to a terminal disclaimer.

(21) Appl. No.: 11/561,845

(22) Filed: Nov. 20, 2006

(65) Prior Publication Data

US 2007/0130501 A1 Jun. 7, 2007

Related U.S. Application Data

(63) Continuation of application No. 09/058,496, filed on Apr. 10, 1998, now Pat. No. 7,139,970.

(51) Int. Cl.
*G06F 17/00* (2006.01)
*G09G 5/00* (2006.01)

(52) U.S. Cl. ........ 715/234; 715/201; 715/247; 715/273; 345/629; 345/636

(58) Field of Classification Search ............ 715/200, 715/201, 202, 204, 205, 207, 209, 210, 234, 715/243, 246, 247, 255, 256, 273, 731, 760, 715/790, 791, 796, 802; 345/24, 418, 441, 345/501, 581, 582, 592, 594, 619, 621, 622, 345/625, 629, 630, 635, 636, 644, 650, 661, 345/676

See application file for complete search history.

(56) References Cited

U.S. PATENT DOCUMENTS

| 4,847,604 | A | | 7/1989 | Doyle |
| 5,404,316 | A | | 4/1995 | Klingler et al. |
| 5,553,211 | A | * | 9/1996 | Uotani .......................... 345/641 |
| 5,581,670 | A | | 12/1996 | Bier et al. |
| 5,657,462 | A | | 8/1997 | Brouwer et al. |
| 5,684,715 | A | | 11/1997 | Palmer |
| 5,692,212 | A | | 11/1997 | Roach |
| 5,708,845 | A | * | 1/1998 | Wistendahl et al. .......... 715/202 |

(Continued)

FOREIGN PATENT DOCUMENTS

DE 42 25 872 A1 5/1995

OTHER PUBLICATIONS

Freund et al. "Accelerated Volume Rendering Using Homogeneous Region Encoding", IEEE, Oct. 1997, 7 pages.*

(Continued)

*Primary Examiner* — Maikhanh Nguyen
(74) *Attorney, Agent, or Firm* — Fish & Richardson P.C.

(57) ABSTRACT

Apparatus and methods implementing a technique for creating an electronic artwork with a hot area. For a selected layer of the artwork, a non-transparent region is identified and an action is assigned to an area corresponding to the non-transparent region, the action defining a function that will be activated when the area is selected. The technique is advantageous in computer application programs that composite images from layers and for producing HTML (HyperText Markup Language) output that refers to a corresponding composited image, where the action is a URL and the area is defined by an image map.

26 Claims, 2 Drawing Sheets

U.S. PATENT DOCUMENTS

| | | | |
|---|---|---|---|
| 5,727,141 A | | 3/1998 | Hoddie et al. |
| 5,737,553 A | | 4/1998 | Bartok |
| 5,751,281 A | | 5/1998 | Hoddie et al. |
| 5,751,852 A | | 5/1998 | Marimont et al. |
| 5,768,438 A | * | 6/1998 | Etoh ............................ 382/251 |
| 5,774,666 A | | 6/1998 | Portuesi |
| 5,818,455 A | | 10/1998 | Stone et al. |
| 5,844,557 A | | 12/1998 | Shively, II |
| 5,852,810 A | | 12/1998 | Sotiroff et al. |
| 5,900,877 A | * | 5/1999 | Weiss et al. ................... 715/803 |
| 5,918,012 A | | 6/1999 | Astiz et al. |
| 5,926,568 A | * | 7/1999 | Chaney et al. ................ 382/217 |
| 5,940,538 A | * | 8/1999 | Spiegel et al. ................ 382/236 |
| 5,956,701 A | | 9/1999 | Habermehl |
| 5,977,978 A | | 11/1999 | Carey et al. |
| 5,983,244 A | | 11/1999 | Nation |
| 5,987,509 A | * | 11/1999 | Portuesi ........................ 725/113 |
| 5,991,781 A | | 11/1999 | Nielsen |
| 6,034,689 A | | 3/2000 | White et al. |
| 6,075,537 A | | 6/2000 | Adapathya et al. |
| 6,121,981 A | * | 9/2000 | Trower et al. ................. 345/473 |
| 6,130,676 A | * | 10/2000 | Wise et al. .................... 345/619 |
| 6,192,393 B1 | | 2/2001 | Tarantino et al. |
| 6,348,918 B1 | * | 2/2002 | Szeliski et al. ................ 345/419 |
| 6,374,272 B2 | | 4/2002 | Bates et al. |
| 6,616,701 B2 | * | 9/2003 | Doyle ............................ 715/201 |

OTHER PUBLICATIONS

Wang et al., "Representing Moving Images with Layers", IEEE, Sep. 1994, pp. 625-638.*

Miller, U.S. Appl. No. 07/790,327, filed Nov. 12, 1991.

"Macromedia Fireworks Using Fireworks," Macromedia, Inc. May 1998, 3 pgs.

"Adobe PageMill 2.0 User Guide for Macintosh and Windows," Adobe Systems, Inc., 1997 13 pgs.

"Adobe Illustrator 7.0 User Guide," Adobe Systems, Inc. 1997, 14 pgs.

Ang et al., *Polymap: A Versatile Client-Side Image Map for the Web*, http://www.lri.ucsf.edu/polymap/paper/polymap.html.

CompuWorks Labels Version 4.0.000, John P. Osborn—CompuWorks, Inc. (screenshots pp. 1-5).

Doyle et al., *Embedding Interactive External Program Objects Within Open-Distributed Hypermedia Documents*, http://www.eolas.com/papers/Papers/SPIE-95/.

*International Conference on Computer Graphics and Interactive Techniques*, pp. 28-38.

Mapedit Imagemap Editing Software, Version 2.3 for Windows 3.1, Boutell Corn, Inc. (screenshots) http://www.boutell.com/mapedit, pp. 1-23.

MetaMAP® (originally published 1994), http://www.eolas.com/metamap/metamap.htm.

Microsoft Press Computer Dictionary, Third Edition, 1997 Microsoft Corporation, p. 245.

NCSA Imagemap tutorial, web page downloaded from Internet: http://hoohoo.ncsa.uiuc.edu/docs/tutorials/imagemapping.html, pp. 1-4.

Ragget, *HTML 3.2 Reference Specification*, (W3C Working Draft Sep. 9, 1996, http://www/w3.org/pub/WWW/TR/WD-html32-960909), http://www.w3.org/pub/WWW/TR/WD-html32.html.

Seidman, *An HTML Extension to Support Client-Side Image Maps*, http://www.ncsa.uiuc.edu/SDG/IT...dings/DDay/seidman/seidman.html.

*The Originators of Web Plug-In and Applet Technology*, http://www.eolas.com/eolas/papers.htm.

Wong et al., *Interactive Query and Visualization of Medical Images on World Wide*, http://www.lri.ucsf.edu/polymap/paper/spie96.html.

* cited by examiner

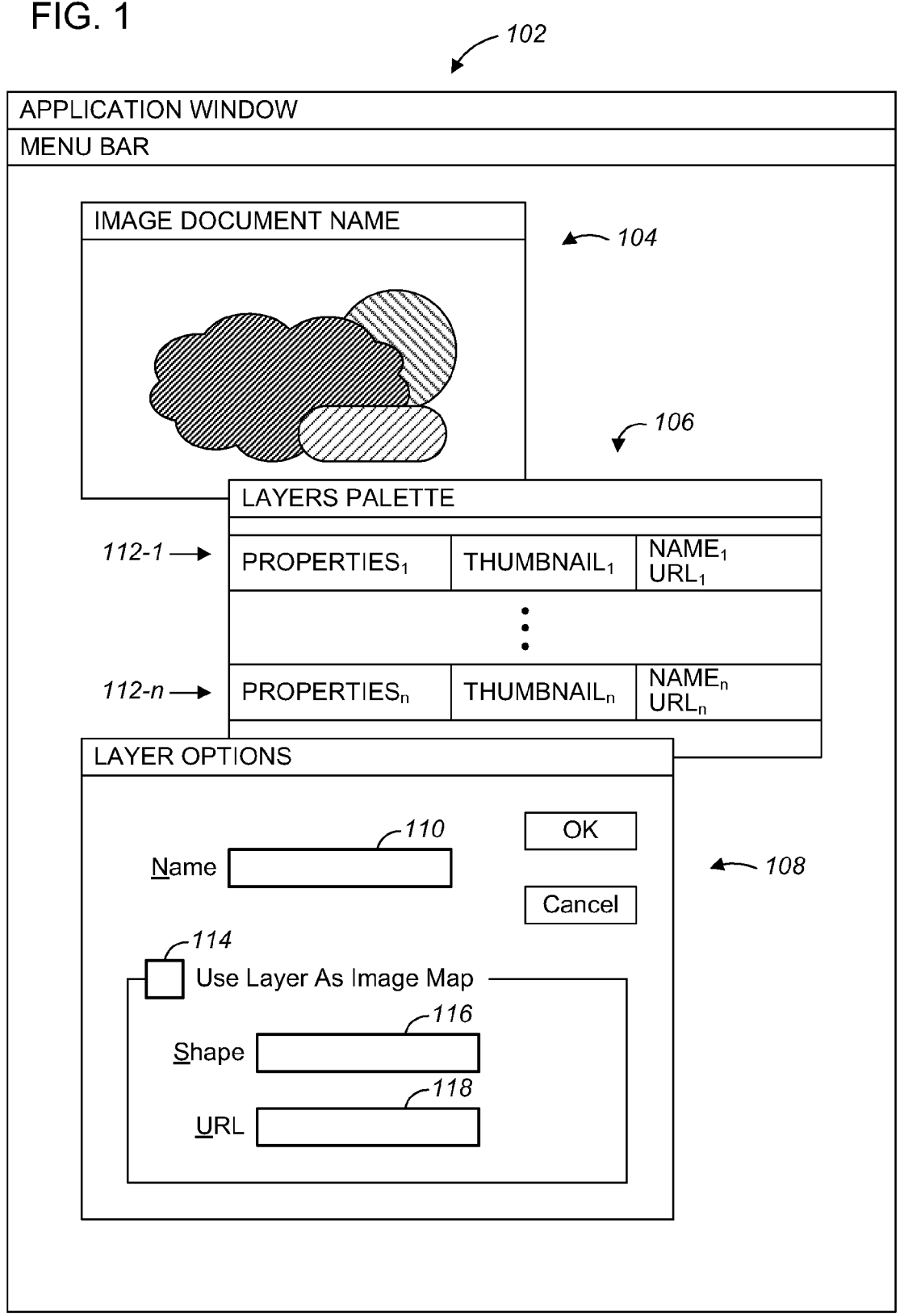

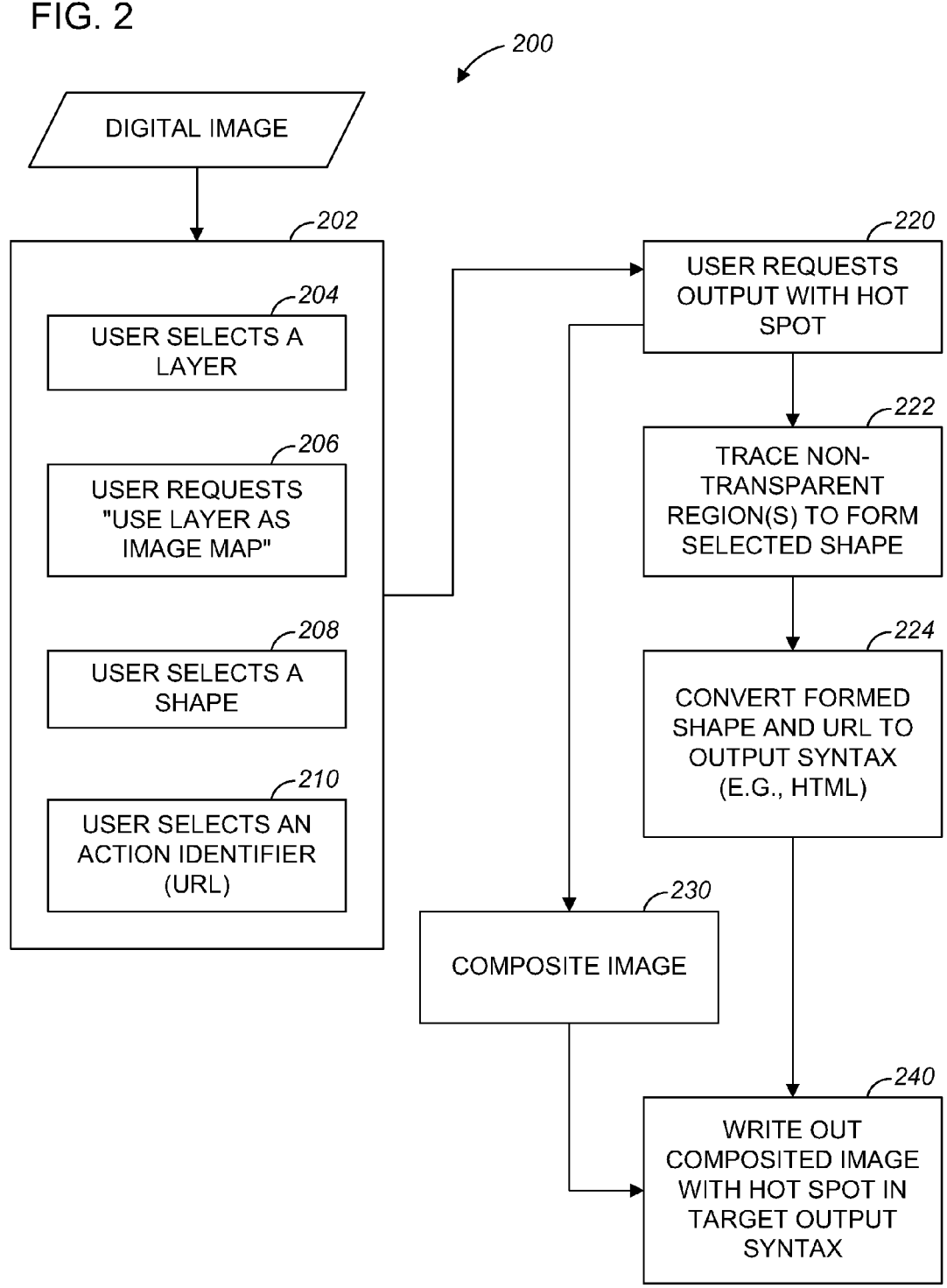

ASSIGNING A HOT SPOT IN AN ELECTRONIC ARTWORK

CROSS-REFERENCE TO RELATED APPLICATIONS

This application is a continuation application of, and claims priority to, U.S. patent application Ser. No. 09/058,496, entitled Assigning a Hot Spot in an Electronic Artwork, to inventors Jeffrey H. Michaud and Douglas K. Olson, which was filed on Apr. 10, 1998, and issued on Nov. 21, 2006, as U.S. Pat. No. 7,139,970. The disclosure of the above application is incorporated herein by reference in its entirety.

BACKGROUND OF THE INVENTION

The invention relates to generating artwork or digital images with hot areas for computer program graphical user interfaces.

Computer program interfaces have long provided user selectable graphics, such as buttons, as elements through which a user may interact with a computer program, to select an option or request a service from the program, for example. In network based or distributed computer program applications, the selection of an interface element in a client program on one computer may be directed to either that program or to another program, such as a server program running on a separate computer. In Internet and intranet applications, the server program typically resides on a server computer remote from the client computer and communicating with it through a network connection.

One widely distributed and used class of client program is the HTML browser, such as the Netscape Navigator™ browser, available from Netscape Communications Corporation of Mountain View, Calif. Browsers typically provide support for a number of industry standard protocols, such as HTTP (HyperText Transport Protocol), and industry standard formats, such as HTML (HyperText Markup Language).

An HTML document may include links to other resources. Graphically, the simplest form of link is the URL (Universal Resource Locator) of the resource displayed in the familiar form of underlined text. Access to a resource may also be provided through an image that a user may select to request the resource. The HTML specification includes, among other elements, a MAP element and an IMG element with an ISMAP attribute for this purpose. The ISMAP element can be used to define a server side image map. When the user clicks on the image, the ISMAP attribute of the element causes the image (x,y) coordinates of location clicked to be passed to the server in a derived URL. A MAP element may be used with an IMG element to provide a client side image map. AREA elements define simple closed regions, such as polygons and circles, by their coordinates within the image. AREA elements in a MAP element can define hot spots or areas on the image and link the hot spots to URLs. A hot spot is an area of an image, which may correspond to graphic object or a section of text, that activates a function when selected.

SUMMARY OF THE INVENTION

In general, in one aspect, the invention features apparatus and methods implementing a technique for creating an electronic artwork with a hot area. For a selected layer of the artwork, a non-transparent region is identified and an action is assigned to an area corresponding to the non transparent region, the action defining a function that will be activated when the area is selected. The technique is advantageous in computer application programs that composite images from layers.

Advantageous implementations of the technique include one or more of the following features. The action is a URL (Uniform Resource Locator). The layers of the artwork are composited and the area and the action are converted to a target output format. The target output format is HTML (HyperText Markup Language). A boundary of the non transparent region is calculated and a definition of the area is calculated from the boundary. The composited artwork is written out as an image file and an HTML file is written out; the HTML file contains an image map for the area and a URL for the action, and refers to the image file.

Among the advantages of the invention are one or more of the following. An image object associated with a hot spot can be edited, and the hot spot will be conformed automatically to the edited object. The content of a layer defining a hot spot can be dynamic, that is, computed from other data at the time the layers are composited, and the hot spot will be conformed automatically to the dynamic content. Multiple hot spots can easily be created in a composite artwork. The method of assigning hot spots can be added easily to any graphics application that supports layers. The regions in the artwork layer by which a hot spot is defined do not have to be visible in the final composited image. For example, a visibility attribute of a hot spot layer can be set to invisible, and the hot spot will still be generated.

Other features and advantages of the invention will become apparent from the following description and from the claims.

BRIEF DESCRIPTION OF THE DRAWINGS

FIG. 1 is a schematic diagram of user interface elements in accordance with the present invention.

FIG. 2 is a flow chart of a method for creating a hot spot in an electronic artwork in accordance with the present invention.

DETAILED DESCRIPTION

A wide variety of systems exist by which a user, such as an artist, can generate an electronic artwork. Graphics applications-that is, computer programs designed to enable a user to manipulate data or images, or to create images from data or from a library of shapes-enable the user to produce an electronic artwork (a picture) interactively. Two such applications are Adobe® Illustrator and Adobe® Photoshop, available from Adobe Systems Incorporated of San Jose, Calif. In general, a picture can include text, images, and shapes.

Many graphics applications build a final image by compositing several image layers together. The image layers may be thought of as stacked sheets of acetate, with transparent and non transparent areas. In computer programs, the color and density of the ink on the acetate sheet are generally represented by a color value and an opacity (or "alpha") value, respectively.

Each layer typically includes image data, an optional mask, and compositing controls. Typically, the image data is represented by an array of pixels, with each pixel having a color and, optionally, an opacity. Typically, too, the mask is represented by an array of pixels, with each pixel having an opacity. Alternatively, the image data or the mask or both can be defined analytically, e.g., by using shape outlines, or by other functions that map positions to color and opacity. In addition, the image data and the mask can be dynamic, i.e., computed from other data at the time the layers are composited.

FIG. 1 shows in schematic form a conventional application window 102 displayed on a computer display device by the graphical user interface of a graphics application. Within the window 102 are displayed a window 104 showing a picture, and a layers palette window 106 and a layer options dialog box 108 providing information and controls in accordance with invention, by which a user can cause a hot spot to be assigned to an area of the picture.

As shown in FIG. 2, a method 200 of assigning a hot spot to an area in an electronic artwork operates in the context of a digital image (that is, a picture) of a kind that has or can have layers. Through a user interface, the user performs a group of steps (steps 202) to select a layer (which may involve creating a layer) (step 204), to assign a hot spot to the selected layer (step 206), to select a shape for the hot spot (step 208), and to select an action identifier, such as a URL, for the hot spot (step 210).

The foregoing steps can be performed by the user through the layer options dialog box 108 (FIG. 1), as follows. The user enters a name in name box 110. This name will be one of the names $NAME_1$ through $NAME_n$ of the layers of the picture, which names are shown in the layers palette rows 112-1 through 112-n. The name box 110, like the shape box 116 and the URL input box 118, can be implemented to provide pull down menus showing permissible or most recently used values.

By checking check box 114, the user indicates that the selected layer is to be used to define the area of a hot spot. In the illustrated implementation, this is done by creating an image map. The shape of the hot spot is indicated by the user in shape box 116 and the action to be associated with the hot spot is indicated in URL box 118. In the illustrated implementation, the permitted shapes are those supported by a target HTML format, namely rectangle, circle, and polygon, and the actions supported are URLs (Uniform Resource Locators). When a hot spot has been assigned to a layer, the assigned URL is displayed with the layer name, as indicated in rows 112-1 and 112-n. If no hot spot has been assigned, no URL would appear. The application associates the hot spot information—the shape and the URL—with the layer as a property of the layer.

At some time, the user will instruct the application to produce a form of output that includes hot spots (step 220, FIG. 2). In the illustrated implementation, in which the hot spot is an area of the picture and the target file format is HTML, this can occur when the user requests the application to show a preview of the artwork in a browser or when the user requests the application to export the artwork as an image file referred to by a generated HTML file.

In response to the request, the application composites the layers of the picture, as it would have done in the absence of hot spots, and the application prepares the hot spot information for output or display, as will now be described. If the graphics application supports dynamic content in layers, the dynamic content for the layers used to define hot spots is calculated before the hot spots are calculated.

In selecting a layer to define a hot spot, the user will naturally select a layer that has one or more non transparent regions in a transparent frame. The non-transparent region or regions in combination define the area of the hot spot. Each non transparent region is converted to a perimeter boundary path to which the selected shape is fit (step 222). This may be done by tracing the outer boundary of each non transparent region in the layer.

In one implementation, the pixels in the layer are scanned and a 1-bit deep bitmap is created for each non transparent region. For each identified non transparent region, the outer boundary is traced to create a polygon approximating the outer boundary of the region's original pixels. If shape other than a polygon is requested, the polygons are converted to the requested shape. The union of the one or more shapes formed in this way defines the area of the hot spot, which may be non-contiguous and therefore may generate multiple image maps in an HTML implementation.

In one implementation, the regions are found as follows. The pixels in a copy of the layer (which may be a partial copy) are scanned in a regular fashion. When the first non-transparent pixel is found, it is given a recognizable value and is used as a seed pixel in a seed fill algorithm that is applied to find all contiguous non-transparent pixels, each of which is given the same recognizable value. In this way, the application finds a contiguous region in the layer. The bounding box of the region (the minimum rectangle that includes all pixels of the region) is calculated and stored to use in optimizing later processing. The scanning process is then resumed. When a non-transparent pixel is found, the application determines whether it is part of a region that has already been found. If it is not, it is given a different recognizable value and the process of finding the extent of the new region is repeated beginning with this new seed pixel. The process continues until all pixels have been scanned.

In one implementation, any holes within a region are ignored. In an alternative implementation, a region having holes is separated to create separate regions that do not contain holes, and the shapes formed from the separate regions contribute to defining the area of the hot spot, as has been described.

Having information necessary to specify a hot spot—namely one or more formed shapes and a URL (or other action request)—the application converts this information in the target output format, such as HTML (step 224).

The application may also have to convert the composited picture to a target output format, such as GIF (Graphics Interchange Format), JPEG (Joint Photographic Experts Group), or PNG (Portable Network Graphics).

Having both the composited picture (from step 230) and the hot spot information in the target output format (from step 224), the application can write the composited image with the hot spot information as a file, display it on a display device, or print it. In the illustrated implementation, the target output format is HTML.

The invention can be implemented in digital electronic circuitry or in computer hardware, firmware, software, or in combinations of them. Apparatus of the invention can be implemented in a computer program product tangibly embodied in a machine readable storage device for execution by a computer processor; and method steps of the invention can be performed by a computer processor executing a program to perform functions of the invention by operating on input data and generating output. Suitable processors include, by way of example, both general and special purpose microprocessors. Generally, a processor will receive instructions and data from a read-only memory and/or a random access memory. Storage devices suitable for tangibly embodying computer program instructions include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, specially designed ASICs (application specific integrated circuits).

Other implementations are within the scope of the following claims.

What is claimed is:

1. A system comprising:
   a display device;
   a programmable processor operable to execute computer program instructions;
   a storage device embodying instructions executable by the programmable processor to:
      display an electronic artwork having a plurality of layers on the display device, each layer including image data;
      receive an input selecting a layer in the electronic artwork, the image data of the selected layer including opacity data;
      calculate a perimeter boundary of a non-transparent region defined by the opacity data;
      use the perimeter boundary to define an area of the selected layer;
      assign an action to the area, the action defining a function that is to be activated when the area is selected; and
      associate the area and the action with the selected layer as a property of the selected layer in the electronic artwork.

2. The system of claim 1, wherein the plurality of layers include compositing controls and the storage device embodies instructions to:
   composite the plurality of layers of the artwork by combining the plurality of layers to produce a final image; and
   convert the area and the action to a target output format.

3. The system of claim 2, wherein the storage device embodies instructions to:
   output the final image as a final image file; and
   output the final image file as an HTML file including an image map for the area and a URL (Uniform Resource Locator) for the action.

4. The system of claim 2, wherein the target output format is HTML (HyperText Markup Language).

5. The system of claim 1, wherein:
   the image data in the selected layer has two or more non-continuous non-transparent regions; and
   the two or more non-contiguous non-transparent regions in combination are used to calculate the perimeter boundary.

6. The system of claim 5, wherein the storage device embodies instructions to:
   generate multiple image maps from the non-transparent regions.

7. The system of claim 1, wherein the storage device embodies instructions to:
   automatically fit a shape to the perimeter boundary, wherein the shape defines the area.

8. The system of claim 1, wherein there is a hole in the non-transparent region and the storage device embodies instructions to:
   separate the non-transparent region into separate hole free non-transparent regions; and
   calculate the perimeter boundary from the separate hole free non-transparent regions.

9. The system of claim 1, wherein:
   there is a hole within the non-transparent region; and
   the hole is ignored in calculating the perimeter boundary.

10. A method comprising:
   calculating a perimeter boundary of a non-transparent region in a selected layer of an electronic artwork having a plurality of layers, the selected layer including image data, the image data including opacity data, the non-transparent region being defined by the opacity data of the selected layer;
   using the perimeter boundary to define an area;
   assigning an action to the area, the action defining a function that is to be activated when the area is selected; and
   associating the area and the action with the selected layer as a property of the selected layer in the electronic artwork.

11. The method of claim 10, wherein associating the area and the action with the selected layer comprises rendering an HTML (HyperText Markup Language) document with a URL (Uniform Resource Locator) as the action.

12. The method of claim 10, wherein:
   the image data in the selected layer has two or more non-contiguous non-transparent regions; and
   the two or more non-contiguous non-transparent regions in combination are used in calculating the perimeter boundary.

13. The method of claim 10, wherein using the perimeter boundary to define an area further comprises automatically fitting a shape to the perimeter boundary.

14. The method of claim 10, further comprising:
   compositing the plurality of layers of the artwork by combining the plurality of layers to produce a final image; and
   converting the area and the action to a target output format.

15. The method of claim 14, further comprising:
   outputting the final image as an image file; and
   outputting the image file as an HTML (HyperText Markup Language) file including an image map for the area and a URL (Uniform Resource Locator) for the action.

16. The method of claim 10, wherein:
   there is a hole within the non-transparent region; and
   the hole is ignored in calculating the perimeter boundary.

17. The method of claim 10, wherein there is a hole within the non-transparent region; and
   the non-transparent region is separated into separate hole free non-transparent regions; and
   the perimeter boundary is calculated from the separate hole-free non-transparent regions.

18. The method of claim 10, further comprising generating multiple image maps from the non-transparent region.

19. A method comprising:
   receiving an electronic artwork having a plurality of layers, each layer including image data;
   selecting a layer of the plurality of layers of the electronic artwork, the image data of the selected layer including opacity data;
   calculating a perimeter boundary of a non-transparent region from the opacity data of the selected layer included in the plurality of layers;
   automatically fitting a shape selected from a group of permitted shapes to the perimeter boundary of the non-transparent region of the selected layer; and
   rendering a document that associates the shape and an action associated with the shape with the selected layer as a property of the selected layer in the electronic artwork, the action defining a function that is activated upon the shape being selected.

20. The method of claim 19, wherein rendering a document comprises rendering an HTML (HyperText Markup Language) document.

21. A system comprising:
   a display device;
   a programmable processor operable to execute computer program instructions;

a storage device embodying instructions executable by the programmable processor to:

display an electronic artwork having a plurality of layers on the display device;

calculate a perimeter boundary of a non-transparent region in a selected layer of the electronic artwork having the plurality of layers, the selected layer including image data, the image data including opacity data, the non-transparent region being defined by the opacity data of the selected layer;

use the perimeter boundary to define an area;

assign an action to the area, the action defining a function that is to be activated when the area is selected; and associate the area and the action with the selected layer as a property of the selected layer in the electronic artwork.

22. The system of claim 21, wherein the storage device embodies instructions to render an HTML (HyperText Markup Language) document with a URL (Uniform Resource Locator) as the action.

23. The system of claim 21, wherein the storage device embodies instructions to automatically fit a shape to the perimeter boundary.

24. The system of claim 21, wherein the storage device embodies instructions to generate multiple image maps from the non-transparent region.

25. A system comprising:

a display device;

a programmable processor operable to execute computer program instructions;

a storage device embodying instructions executable by the programmable processor to:

receive an electronic artwork having a plurality of layers, each layer including image data;

select a layer of the plurality of layers of the electronic artwork, the image data of the selected layer including opacity data;

calculate a perimeter boundary of a non-transparent region from the opacity data of the selected layer included in the plurality of layers;

automatically fit a shape selected from a group of predetermined shapes to the perimeter boundary of the non-transparent region of the selected layer; and render a document that associates the shape and an action associated with the shape with the selected layer as a property of the selected layer in the electronic artwork, the action defining a function that is activated upon the shape being selected.

26. The system of claim 25, wherein the instructions executable by the programmable processor to render a document comprise instructions executable by the programmable processor to render an HTML (HyperText Markup Language) document.

* * * * *